United States Patent
Behm et al.

[11] Patent Number: 6,055,863
[45] Date of Patent: *May 2, 2000

[54] PRESSURE SENSOR AND TRANSMITTER HAVING A WELD RING WITH A ROLLING HINGE POINT

[75] Inventors: Steven M. Behm, White Bear Lake; Jeffrey C. Brekken, Richfield, both of Minn.

[73] Assignee: Rosemount Inc., Eden Prairie, Minn.

[*] Notice: This patent is subject to a terminal disclaimer.

[21] Appl. No.: 09/321,144

[22] Filed: May 27, 1999

Related U.S. Application Data

[63] Continuation of application No. 09/067,601, Apr. 28, 1998, Pat. No. 5,922,965.

[51] Int. Cl.[7] .................................................. G01L 9/00
[52] U.S. Cl. ............................................................. 73/706
[58] Field of Search ................................................. 73/706

[56] References Cited

U.S. PATENT DOCUMENTS

| | | | |
|---|---|---|---|
| 5,094,109 | 3/1992 | Dean et al. ........................... | 73/718 |
| 5,595,939 | 1/1997 | Otake et al. ........................... | 437/209 |
| 5,922,965 | 7/1999 | Behm et al. ........................... | 73/706 |

FOREIGN PATENT DOCUMENTS

| | | |
|---|---|---|
| 0 607 482 A1 | 7/1994 | European Pat. Off. . |
| 503949 C | 7/1930 | Germany . |

*Primary Examiner*—Joseph L. Felber
*Attorney, Agent, or Firm*—Westman, Champlin & Kelly, P.A.

[57] ABSTRACT

A process control instrument adapted to provide an output indicative of a parameter of a process fluid is disclosed. The process control instrument is designed to be attachable to a flange having a first passageway filled with process fluid. A body of the process control instrument has an opening adjacent to the first passageway adapted to receive process fluid from the first passageway. An isolation diaphragm is positioned in the opening of the body and separates the opening and the first passageway from a second passageway. A weld ring positioned in the opening is adapted to evenly distribute an attachment force across a support surface such that damage to the isolation diaphragm is minimized.

13 Claims, 5 Drawing Sheets

PRESSURE SENSOR AND TRANSMITTER HAVING A WELD RING WITH A ROLLING HINGE POINT

This is a Continuation Application of U.S. patent application Ser. No. 09/067,601 filed on Apr. 28, 1998, now U.S. Pat. No. 5,922,965, entitled "PRESSURE SENSOR AND TRANSMITTER HAVING A WELD RING WITH A ROLLING HINGE POINT."

BACKGROUND OF THE INVENTION

The present invention relates to a process control instrument. In particular, it relates to a pressure transmitter with an isolator diaphragm.

Transmitters which sense pressure have a pressure sensor coupled to at least one isolation diaphragm. The transmitters typically attach to a flange and include an opening which is aligned to receive process fluid from a passageway in the flange. The isolation diaphragm is positioned in the opening, and isolates the pressure sensor from corrosive process fluids being sensed. Pressure is transferred from the isolation diaphragm to the sensor having a sensing diaphragm through a substantially incompressible isolation fluid carried in a passageway. U.S. Pat. Nos. 4,833,922 entitled MODULAR PRESSURE TRANSMITTER and 5,094,109 entitled PRESSURE TRANSMITTER WITH STRESS ISOLATION DEPRESSION show pressure transmitters of this type.

Pressure transmitters frequently include a weld ring positioned within the opening surrounding the isolation diaphragm. The weld ring can be welded to the transmitter body and to the isolation diaphragm, thus securing the isolation diaphragm to the transmitter body. The weld ring can also be used to support a seal, such as an O-ring. When the transmitter is attached to the process flange by an attachment force, such as provided by bolts, the seal and weld ring are compressed against the flange to prevent process fluid from leaking past the opening.

The attachment forces which compress the weld ring against the flange tend to deform or deflect portions of the weld ring. Frequently, the resulting deformation of the weld ring causes the attachment forces to be transferred to a concentrated portion of the isolation diaphragm. This in turn can damage the isolation diaphragm. Even if the isolation diaphragm is not significantly damaged by the concentrated forces transferred by the weld ring, the forces can dent or crease the diaphragm, requiring that the transmitter be recalibrated.

SUMMARY OF THE INVENTION

A process control instrument adapted to provide an output indicative of a parameter of a process fluid is disclosed. The process control instrument is designed to be attachable to a flange having a first passageway filled with process fluid. A body of the process control instrument has an opening adjacent to the first passageway adapted to receive process fluid from the first passageway. An isolation diaphragm is positioned in the opening of the body and separates the opening and the first passageway from a second passageway. A weld ring positioned in the opening is adapted to evenly distribute an attachment force across a support surface such that damage to the isolation diaphragm is minimized.

DETAILED DESCRIPTION OF THE PREFERRED EMBODIMENTS

Figure 1:
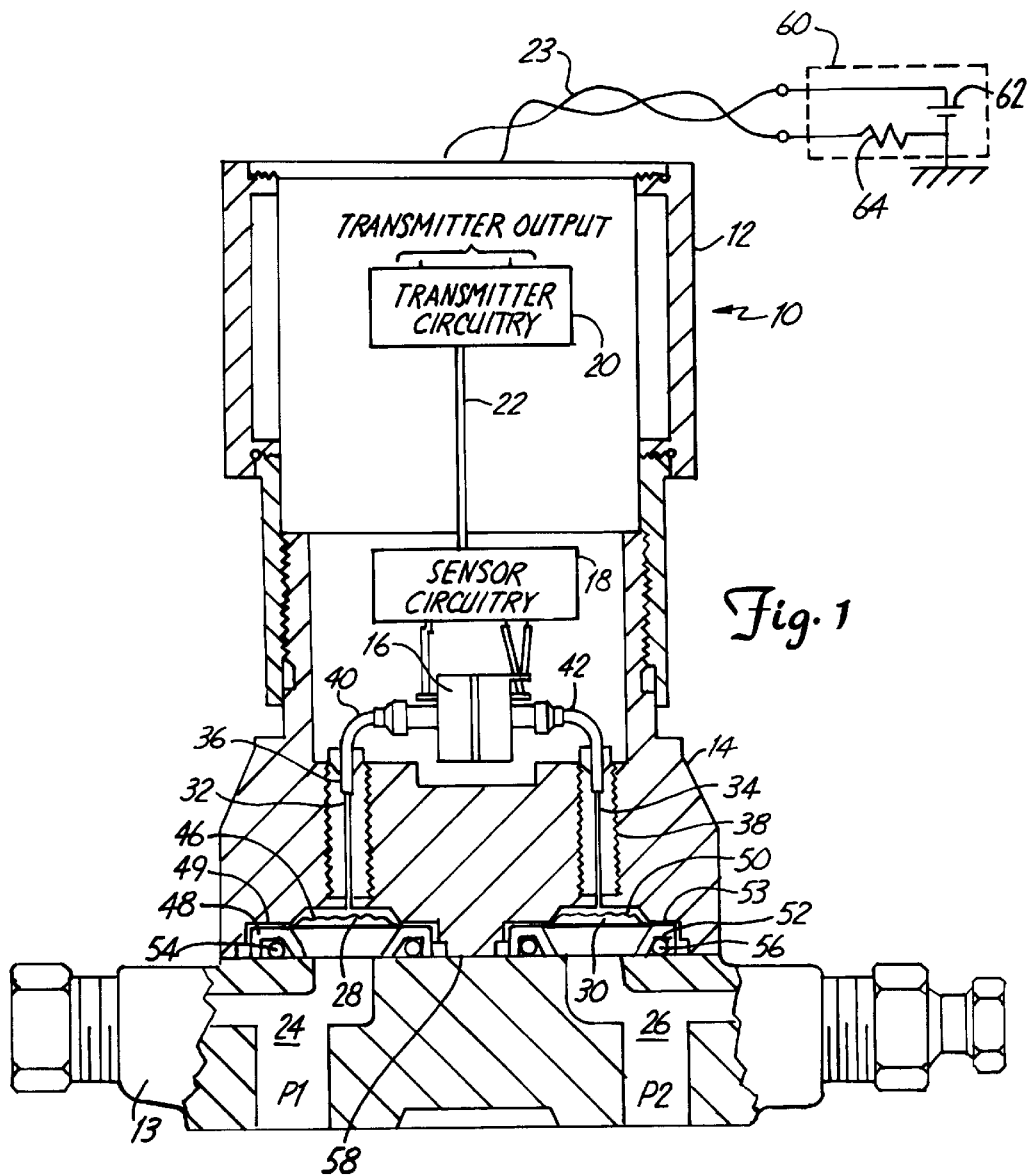
FIG. 1 is a cross-sectional fragmentary view of a pressure transmitter having a weld ring and support surface in accordance with the present invention.

FIG. 1 shows pressure transmitter 10 having transmitter body 12, flange (or coplanar manifold) 13 and sensor body 14 in accordance with the present invention. Although the present invention is shown with a coplanar flange, the invention may be used with any type of flange, manifold, or other coupling adapted to receive process fluid. Sensor body 14 includes pressure sensor 16, and transmitter body 12 includes transmitter circuitry 20. Sensor circuitry 18 is coupled to transmitter circuitry 20 through communication bus 22. Transmitter circuitry 20 sends information related to pressure of the process fluid over a two-wire 4–20 mA process control loop 23. Transmitter 10 transmits information related to the process fluid pressure to control room 60 or to other devices (not shown) coupled to process control loop 23. Process control room 60 is modeled as power source 62 and resistor 64. Transmitter 10 can be completely powered by power received over loop 23.

Pressure sensor 16 can be an absolute or a differential pressure sensor. In embodiments in which pressure sensor 16 is a differential pressure sensor, sensor 16 measures a difference in pressure between pressure P1 in passageway 24 and pressure P2 in passageway 26 of flange 13. Pressure P1 is coupled to sensor 16 through passageway 32. Pressure P2 is coupled to sensor 16 through passageway 34. Passageway 32 extends through coupling 36 and tube 40. Passageway 34 extends through coupling 38 and tube 42. Passageways 32 and 34 are filled with a relatively incompressible fluid such as oil. Couplings 36 and 38 are threaded into sensor body 14 and provide a long flame-quenching path between the interior of the sensor body carrying sensor circuitry 18 and process fluid contained in passageways 24 and 26.

Passageway 24 is positioned adjacent to opening 28 in sensor body 14. Passageway 26 is positioned adjacent to opening 30 in sensor body 14. Diaphragm 46 is positioned in opening 28 and is coupled to sensor body 14 adjacent to passageway 24. Passageway 32 extends through coupling 36 and sensor body 14 to diaphragm 46. Diaphragm 50 is coupled to sensor body 14 adjacent to passageway 26. Passageway 34 extends through coupling 38 and sensor body 14 to diaphragm 50.

Weld ring 48 is positioned within opening 28 and is welded to support surface 49 of sensor body 14. Weld ring 52 is positioned within opening 30 and is welded to support surface 53 of sensor body 14. Weld rings 48 and 52 are typically substantially identical and are preferably annular shaped and positioned within openings 28 and 30 surrounding isolation diaphragms 46 and 50. In some preferred embodiments, the welds used to attach the weld rings to sensor body 14 also attach the respective isolation diaphragms to the sensor body. Weld rings 48 and 52 can also be used to support a seal for sealing openings 28 and 30 to prevent process fluid from passageways 24 and 26 from leaking. As illustrated, weld rings 48 and 52 support O-ring seals 54 and 56, respectively.

In operation, surface 58 of flange 13 presses against weld rings 48 and 52 and against seals 54 and 56 when transmitter 10 is bolted to flange 13. The bolting or attachment forces imparted upon the weld rings and seals compress the seals to thereby prevent process fluid from leaking past passageways 24 and 26 and openings 28 and 30. The attachment forces also cause deformation of weld rings 48 and 52. Isolation diaphragms 46 and 50 are positioned either partially between respective weld rings 48 and 52 and surfaces 49 and 53, or immediately adjacent to the weld rings without being positioned between the weld rings and the sensor body support surfaces. With isolation diaphragms 46 and 50 being positioned in close proximity to the respective weld rings, deformation of the weld rings by the attachment forces can permanently damage the isolation diaphragms. Even if not permanently damaged, the transfer of highly concentrated or localized forces from corners of the weld rings can crease or dent the isolation diaphragms such that re-calibration is required.

Figure 2:
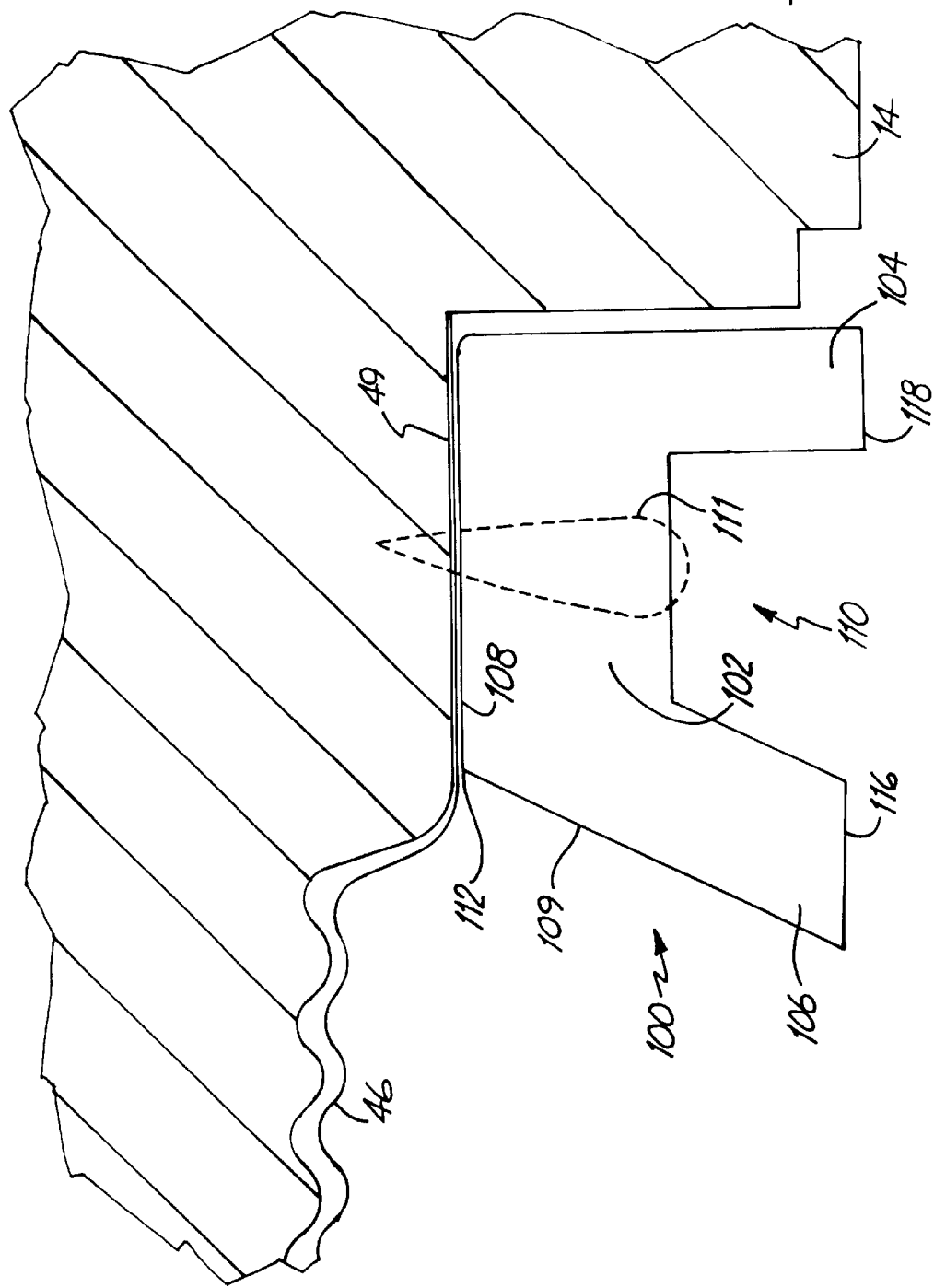
FIG. 2 is a cross-sectional view of a portion of a prior art pressure transmitter illustrating a conventional weld ring design which applies a concentrated force to the isolation diaphragm when the weld ring is deformed by forces attaching the transmitter to a flange.
Figure 3:
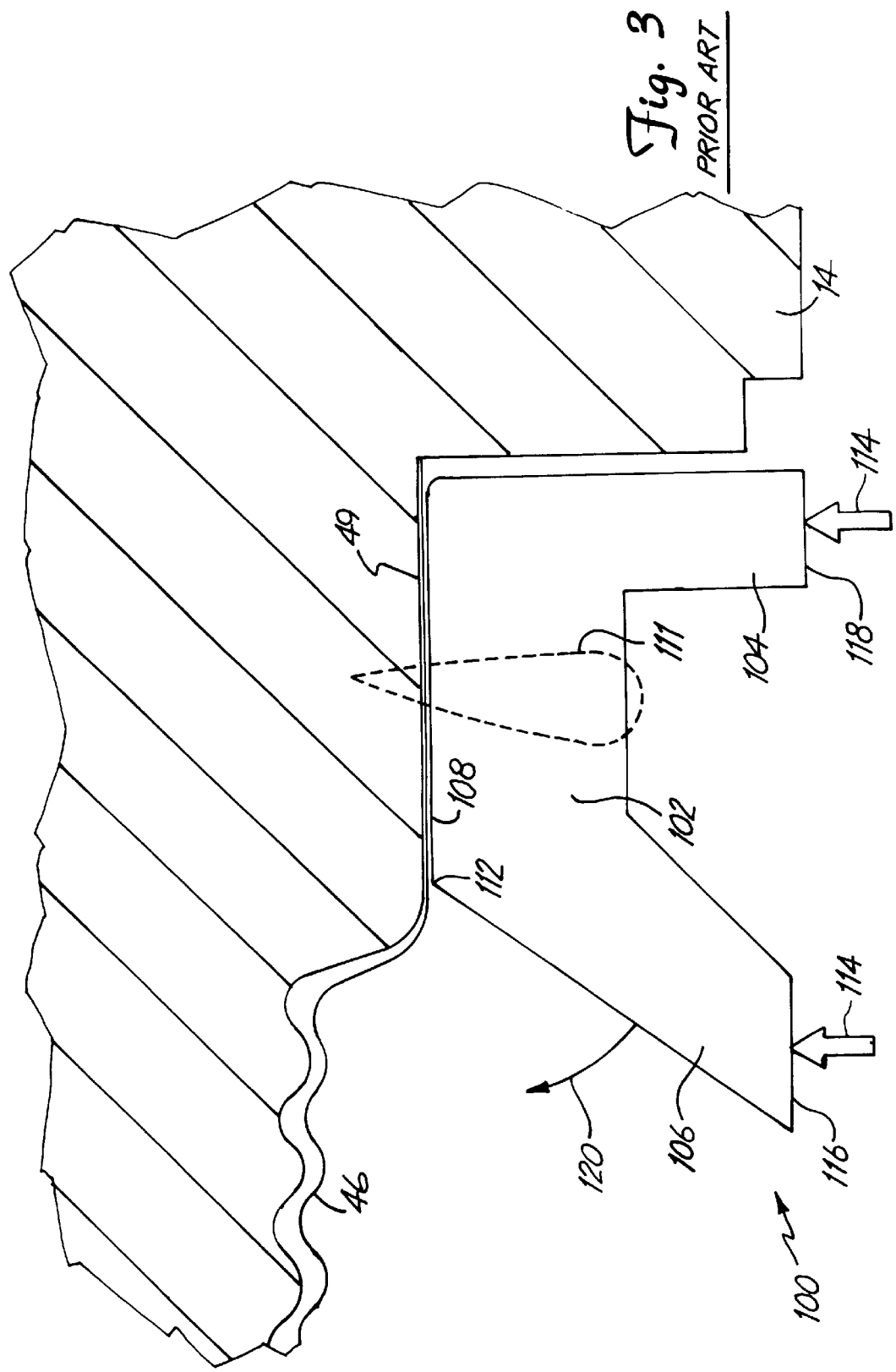
FIG. 3 is a cross-sectional view of the portion of the prior art pressure transmitter illustrated in FIG. 2, further illustrating the weld ring in a deformed or deflected position which applies the concentrated force to the isolation diaphragm.

FIGS. 2 and 3 are diagrammatic views, with portions shown in cross-section, illustrating a conventional weld ring design which can damage the isolation diaphragm when the weld ring transfers bolt forces, attaching the transmitter to a process fluid flange, to the isolation diaphragm. As illustrated initially in FIG. 2, prior art weld ring 100 includes a base portion 102 and arm portions 104 and 106. Arm portions 104 and 106 form a channel 110 which can be used to hold an O-ring or other type of seal.

Base portion 102 provides substantially planar contact surface 108 positioned against substantially planar support surface 49 provided by sensor body 14. Contact surface 108 being positioned against support surface 49 includes surface 108 abutting surface 49 with isolation diaphragm 46 positioned at least partially between the two surfaces. Weld 111, such as a laser weld, attaches weld ring 100 to sensor body 14. If desired, weld 111 can also attach isolation diaphragm 46 to sensor body 14.

Arm portion 106 provides surface 109 which is separated from contact surface 108 by a sharp corner 112. Typically, isolation diaphragm 46 separates corner 112 from support surface 49. Surfaces 116 and 118 provided by arms 106 and 108 are adapted for contact with surface 58 of flange 13 when the transmitter is attached to the flange.

FIG. 3 illustrates weld ring 100 with attachment forces 114 being applied against surfaces 116 and 118 of arm portions 104 and 106. Attachment forces 114 are representational of the environment when the transmitter is bolted to flange 13. As illustrated in FIG. 3, the application of forces 114 against surface 116 of arm 106 has caused arm 106 to deform or bend in the direction of arrow 120. Deformation of arm 106 in this manner results in corner 112 of weld ring 100 applying a highly concentrated or localized force to isolation diaphragm 46. Application of a highly localized force to isolation diaphragm 46 by corner 112 can crease, dent or otherwise damage isolation diaphragm 46. Even if not permanently damaged by corner 112, creasing or denting of diaphragm 46 can result in the need to re-calibrate the transmitter.

Figure 4:
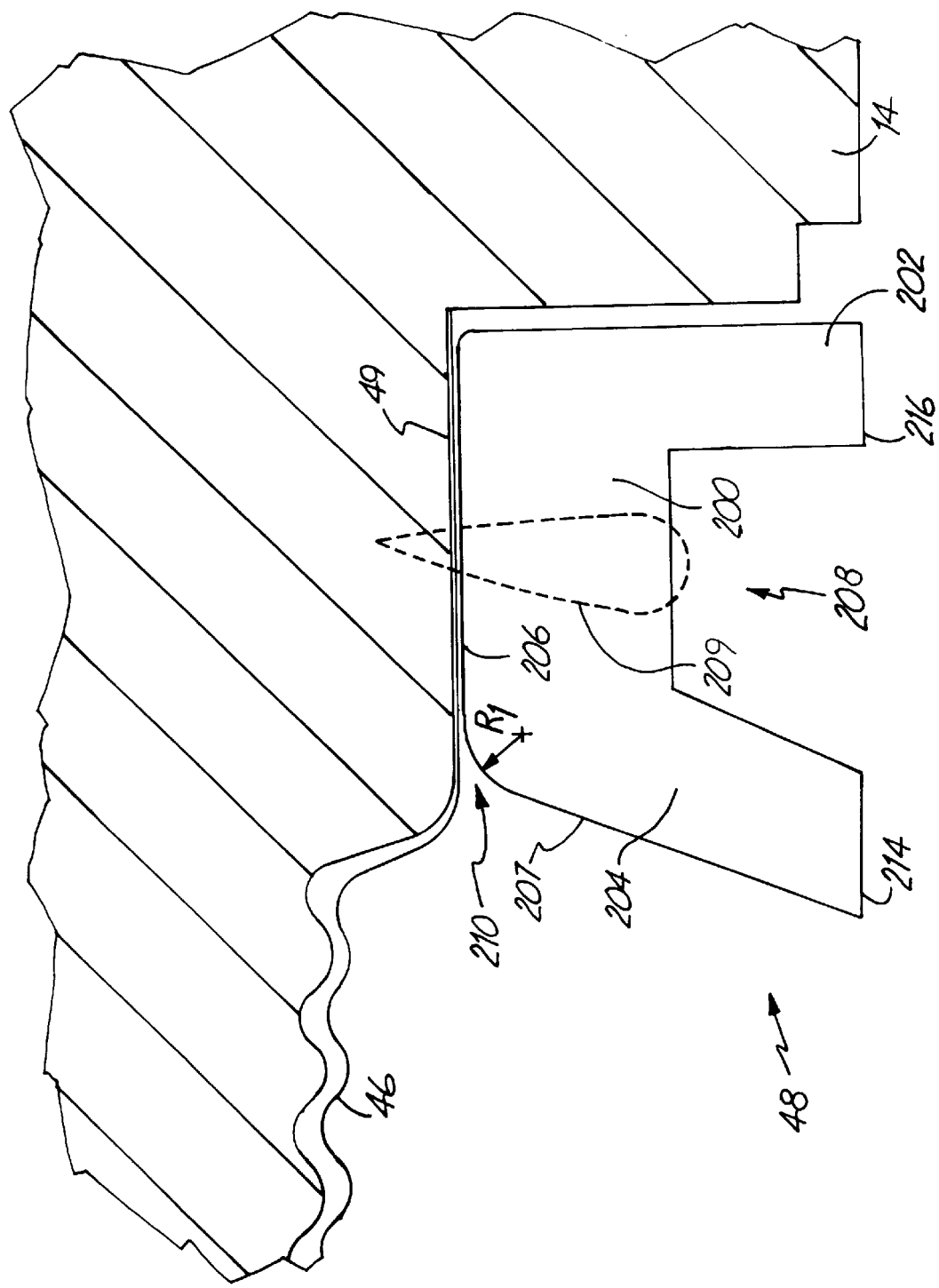
FIG. 4 is a cross-sectional view of a portion of the pressure transmitter of the present invention shown in FIG. 1 which illustrates the weld ring and support surface in greater detail.
Figure 5:
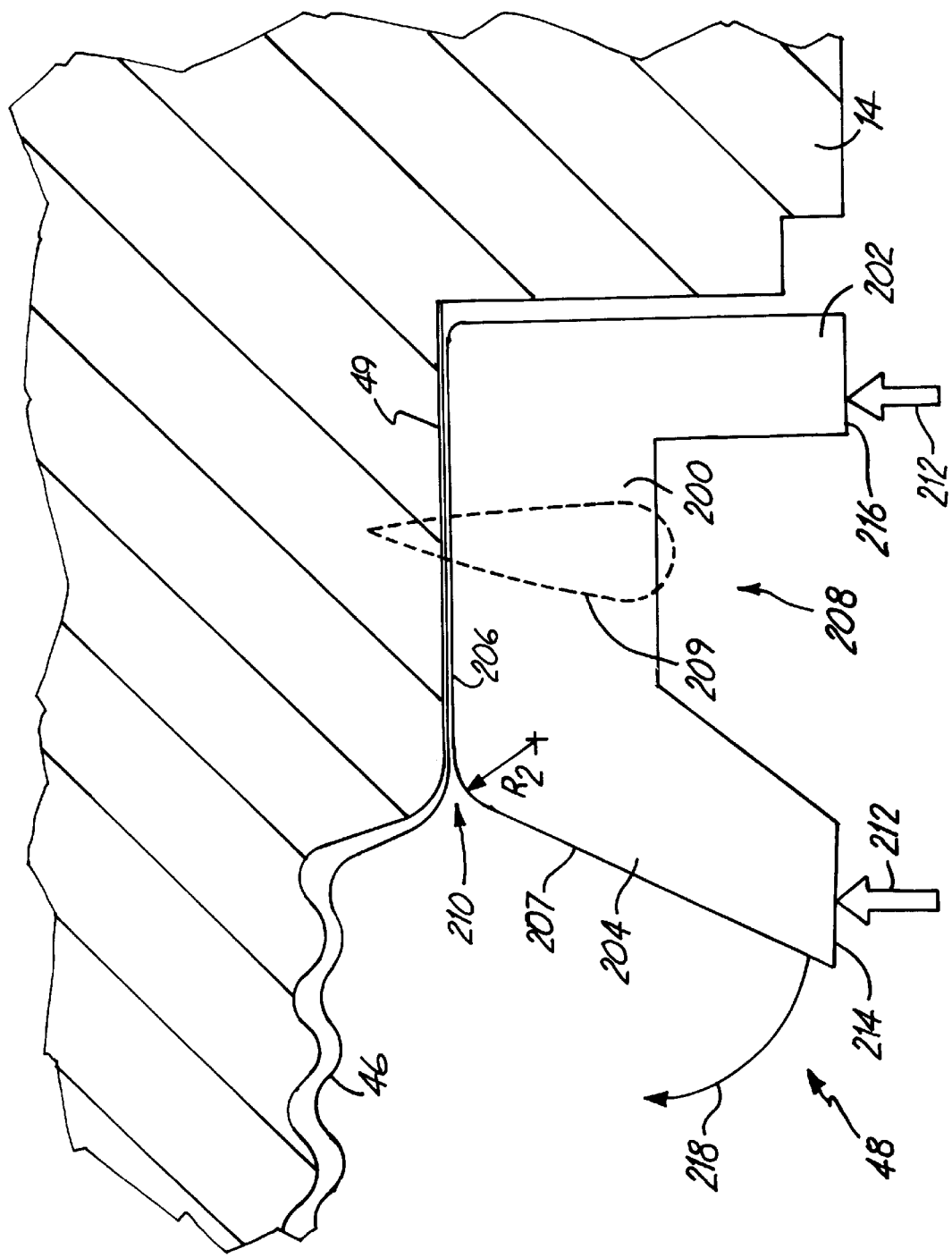
FIG. 5 is a cross-sectional view of the portion of the pressure transmitter of the present invention illustrated in FIG. 4, which further illustrates the weld ring in a deformed or deflected position.

FIGS. 4 and 5 are diagrammatic views, with portions shown in cross-section, illustrating weld ring 48 used in preferred embodiments of transmitter 10 of the present invention. As illustrated initially in FIG. 4, weld ring 48 includes base or weld receiving portion 200 and arm portions 202 and 204. Arm portions 202 and 204 form a channel 208 which can be used to hold a seal material 54 (shown in FIG. 1).

Base portion 200 provides substantially planar contact surface 206 positioned against substantially planar support surface 49 provided by sensor body 14. Contact surface 206 being positioned against support surface 49 includes surface 206 abutting surface 49 with isolation diaphragm 46 positioned at least partially between the two surfaces. Weld 209, such as a laser weld, attaches weld ring 48 to sensor body 14. If desired, weld 209 can also attach isolation diaphragm 46 to sensor body 14.

Surfaces 214 and 216 provided by arm portions 202 and 204 are adapted for contact with surface 58 of flange 13 when the transmitter is attached to the flange. Arm portion 204 provides surface 207 which is separated from contact surface 206 by rolling hinge point 210. Rolling hinge point 210 is preferably a substantially arcuate or curved transition surface between surfaces 206 and 207 of weld ring 48. The substantially arcuate or curved transition surface of rolling hinge point 210 has a curvature which is defined at one portion of the curve by radius $R_1$. Radius $R_1$ is preferably a radius which minimizes the transfer of force to a localized portion of isolation diaphragm 46 as weld ring 48 is deformed by attachment forces. Minimization of the forces transferred to isolation diaphragm 46 occurs by selecting a radius of curvature $R_1$ large enough such that, when compressed by strong attachment forces, the transition surface flattens out against support surface 49. The elimination of sharp corners thus prevents weld ring 48 from transferring a highly localized force to isolation diaphragm 46, while effectively increasing a surface area of contact surface 206 over which the attachment forces can be evenly distributed. Generally, the larger the value of radius of curvature $R_1$, the more smoothly rolling hinge point 210 will flatten. However, dimensional and manufacturing considerations must also be taken into account when optimizing radius $R_1$.

FIG. 5 illustrates weld ring 48 with attachment forces 212 being applied against surfaces 214 and 216 of arm portions 202 and 204. Attachment forces 212 are representational of forces transferred from surface 58 to weld ring 48 when transmitter 10 is bolted to flange 13. As illustrated in FIG. 5, the application of forces 212 against surface 214 of arm 204 has caused the arm to deform or bend in the direction of arrow 218. Deformation of arm 204 in this manner results in the curved transition surface of rolling hinge point 210 flattening out against support surface 49 and isolation diaphragm 46. The flattening of the curved transition surface increases the radius of curvature of the transition surface from $R_1$ to $R_2$. By flattening rolling hinge point against surface 49 and isolation diaphragm 46, effectively increasing the surface area of contact surface 206, the forces attaching transmitter 10 to flange 13 are evenly distributed and damage to the isolation diaphragm is prevented. Thus, the present invention saves repair costs and time. Also, the present invention prevents the need for re-calibration of transmitter 10 after attachment to flange 13.

Although the present invention has been described with reference to preferred embodiments, workers skilled in the art will recognize that changes may be made in form and detail without departing from the spirit and scope of the invention.

What is claimed is:

1. A process fluid pressure transmitter with improved mount, the transmitter comprising:

a body adapted to be attached to a flange having a first passageway fillable with process fluid, the body having a first opening adapted to be positioned adjacent to the first passageway, the body providing a first support surface in the first opening;

a first isolation diaphragm positioned in the first opening of the body and at least partially covering the first support surface; and a first weld ring positioned in the first opening of the body and having a first contact surface positioned against the first support surface, the first contact surface ending at a substantially arcuate transition surface.

2. The transmitter of claim 1, wherein the first weld ring further comprises a second surface, the substantially arcuate transition surface connecting the first contact surface and the second surface.

3. The transmitter of claim 2, wherein the substantially arcuate transition surface is adapted to at least partially flatten in response to an increase in an attachment force used to attach the transmitter to the flange in order to increase an area of the first contact surface positioned against the first support surface.

4. The transmitter of claim 1, wherein the substantially arcuate transition surface is adapted to deform in response to an increase in an attachment force used to attach the transmitter to the flange in order to substantially evenly distribute the attachment force over the first contact surface.

5. The transmitter of claim 1, wherein the first contact surface of the first weld ring is positioned against the first support surface with the first isolation diaphragm positioned at least partially between the first contact surface and the first support surface.

6. The transmitter of claim 5, and further comprising a weld connecting the first contact surface to the first support surface.

7. The transmitter of claim 1, wherein the first support surface and the first contact surface are substantially planar.

8. A process fluid pressure transmitter with improved mount, the transmitter comprising:

a body adapted to be attached to a flange having first and second passageways fillable with process fluid, the body having first and second openings adapted to be positioned adjacent to the first and second passageways, respectively, and adapted to receive process fluid from the respective first and second passageways when the transmitter is attached to the flange, the body also providing first and second support surfaces, respectively, in the first and second openings;

a first isolation diaphragm positioned in the first opening of the body and being attached to and at least partially covering the first support surface;

a second isolation diaphragm positioned in the second opening of the body and being attached to and at least partially covering the second support surface;

a first weld ring positioned in the first opening of the body and having a substantially planar contact surface positioned against the first support surface, the substantially planar contact surface of the first weld ring ending at a substantially curved transition surface; and a second weld ring positioned in the second opening of the body and having a substantially planar contact surface positioned against the second support surface, the substantially planar contact surface of the second weld ring ending at a substantially curved transition surface.

9. The transmitter of claim 8, wherein each of the first and second weld rings further comprises:

a weld receiving portion providing the substantially planar contact surface positioned against the corresponding support surface;

a first arm extending from the weld receiving portion and providing a flange contact surface, the flange contact surface adapted to be positioned in contact with the flange when the transmitter is attached to the flange and to deflect the first arm in response to an increase an the attachment force, the substantially curved transition surface being adapted to flatten against the corresponding support surface as the first arm deflects.

10. The transmitter of claim 9, wherein the substantially curved transition surface of each of the first and second weld rings has a radius of curvature which is optimized such that concentration of the attachment force transferred to a localized region of the corresponding support surface and isolation diaphragm is minimized.

11. The transmitter of claim 10, wherein each of the first and second weld rings further comprises:

a second arm extending from the weld receiving portion, the first and second arms of each weld ring forming a channel therebetween; and sealing material positioned in the channel and adapted to be forced against the flange by the attachment force to prevent process fluid from leaking past the flange.

12. The transmitter of claim 11, wherein the sealing material of each of the first and second weld rings includes an O-ring.

13. A process fluid pressure transmitter with improved mount, the transmitter comprising:

a body adapted to be attached via an attachment force to a flange having a first passageway fillable with process fluid, the body having a first opening adapted to be positioned adjacent to the first passageway, the body providing a first support surface in the first opening;

a first isolation diaphragm positioned in the first opening of the body and at least partially covering the first support surface; and means for evenly distributing the attachment force across the first support surface.

* * * * *